Patented Nov. 1, 1949

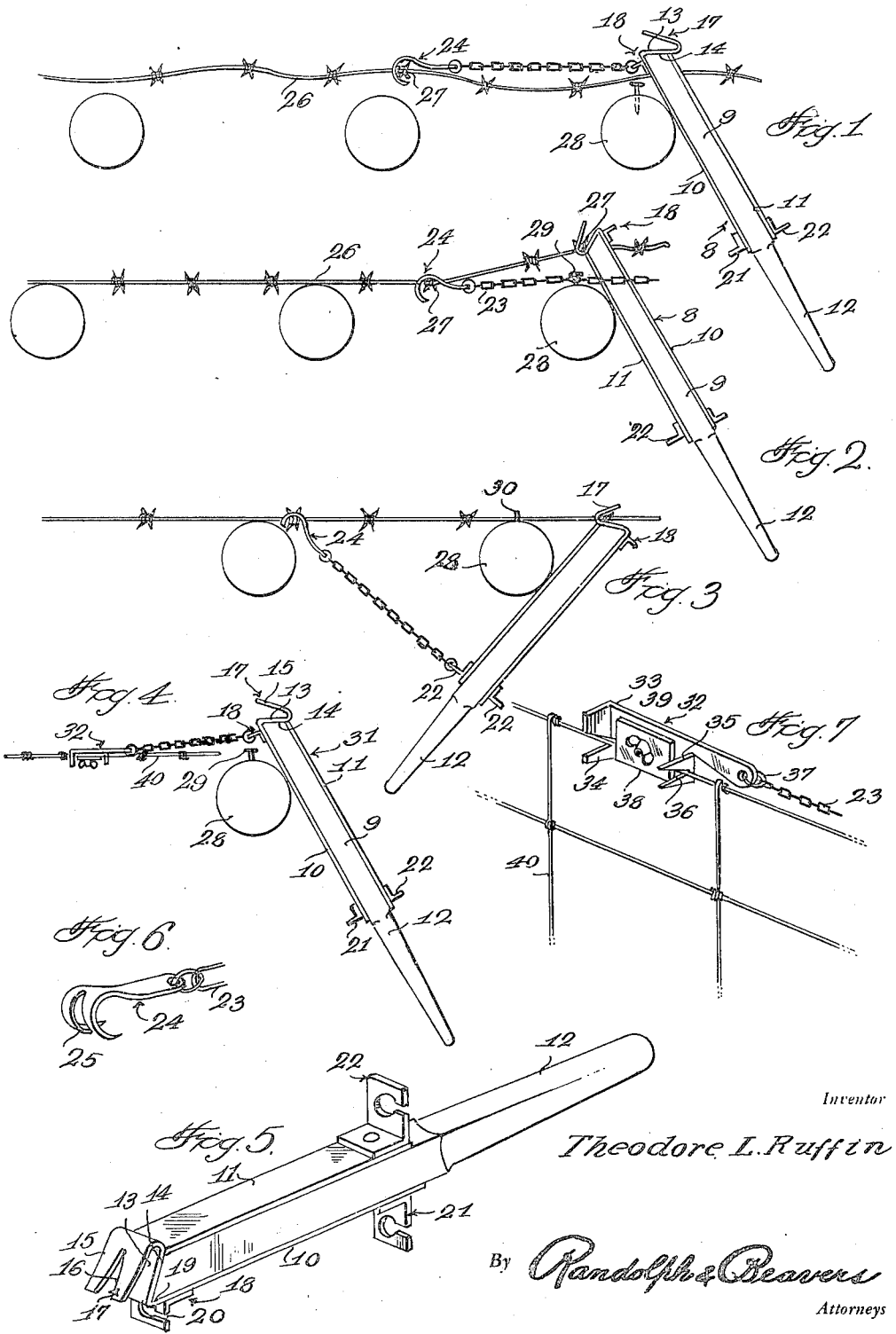

2,486,883

UNITED STATES PATENT OFFICE 2,486,883

STRETCHING IMPLEMENT

Theodore L. Ruffin, Washington, N. C., assignor of one-third to J. D. McCotter and one-third to A. C. Jackson, both of Washington, N. C.

Application July 18, 1947, Serial No. 761,768

2 Claims. (Cl. 254—77)

This invention relates to an implement or device especially adapted for stretching and holding wire fence, either barbed wire strands or mesh wire fence, so that the fence may be quickly and easily stretched to the desired tension and held, while secured to a fence post.

More particularly, it is an object of the present invention to provide an implement for accomplishing the afore-described purpose of extremely simple construction, and which utilizes a lever member for effecting the stretching of the fence and a flexible member for cooperation with the lever member for initially taking up slack of the fence wire and for thereafter cooperating with the lever member in holding the fence wire stretched, while it is secured to a fence post.

Various other objects and advantages of the invention will hereinafter become more fully apparent from the following description of the drawing, illustrating preferred embodiments thereof, and wherein—

Figure 1 is a plan view showing one embodiment of the invention and in its initial position, preparatory to taking up slack in a barbed wire strand of a fence;

Figure 2 is a similar view showing the strand anchored after the slack has been taken up and preparatory to tensioning the wire for securing it to a fence post;

Figure 3 is a similar view showing the wire after it has been tensioned and anchored by the stretching implement, and after it has been anchored to a fence post, while being so held;

Figure 4 is a view similar to Figure 1, showing a slightly modified form of the invention for use with mesh wire fence;

Figure 5 is a perspective view of the lever member;

Figure 6 is a perspective view of the claw hook of the combination of Figures 1 to 3, and Figure 7 is a perspective view of the clamp of the combination of Figure 4 and shown in an applied position.

Referring more specifically to the drawing, and first with reference to the form of the invention as illustrated in Figures 1 to 3, the stretching implement thereof in its entirety is designated generally 8 and includes an elongated bar forming a lever 9 and having reinforcing strips 10 and 11 secured to opposite sides thereof and extending from one end to a point spaced from the opposite end of said lever 9. Said last mentioned or opposite end of the lever 9 is restricted to form a handle 12. The strip 10, at its end remote to the handle 12, is turned to provide a portion 13 which is disposed across the oblique end 14 of the lever 9 and at an acute angle to the first mentioned, straight portion of said bar 10, and which portion 13 terminates in a turned back portion 15 which is disposed at an acute angle to the portion 13 and which is provided with a longitudinal, outwardly diverging notch 16 to form a claw, designated generally 17, and best illustrated in Figure 5. The bar 10, adjacent the claw 17, is provided with a hook 18, projecting outwardly therefrom and which is formed by an L-shaped, substantially rigid strip having one end secured to the outer side of the bar 10, and its opposite, outwardly projecting end or leg is provided with an opening 19 and a slot 20, which communicates therewith and which opens outwardly of a side edge of said outwardly projecting leg. The bar 10 is provided with a similar hook 21, adjacent its inner end and the bar 11 may be provided with a hook 22, corresponding to the hooks 18 and 21 and disposed opposite to said hook 21.

An elongated flexible member, such as a chain 23 is provided with a claw hook 24 at one end thereof, the bill portion of the hook being provided with a longitudinal, outwardly opening and outwardly diverging notch 25, as best seen in Figure 6, to form the claw-shaped bill of said hook.

Assuming that the implement 8 is to be employed for taking up the slack, stretching or tensioning and anchoring a strand of barbed wire, while it is fastened to a fence post, a link of the chain 23 is initially connected to the hook 18, and the claw hook 24 thereof is then engaged over the barbed wire strand 26 and behind one of the barbs 27 thereof. The lever 9 is then positioned against a fence post 28 as a fulcrum and with the reinforcing bar 10 engaging the fence post, and the handle 12 is then engaged for swinging the lever 9 on its fulcrum 28 in a clockwise direction as seen in Figure 1, for initially taking up the slack in the barbed wire strand 26. When the slack has been taken up sufficiently, one of the links of the chain 23 is engaged with a nail or other projection 29 of the fence post, for holding the strand 26 and with the slack thus taken up. The claw 17 is then engaged with one of the barbs 27, as seen in Figure 2, and the lever 9 is again swung in a clockwise direction for finally stretching or tensioning the strand 26 to its position of Figure 3. The chain 23 is then disengaged from the nail or projection 29 and engaged with the hook 21 of the lever 9 for holding the barbed wire strand thus tensioned, and while it is stapled or otherwise secured, as seen at 30 to the fence post 28.

The stretching and holding implement, illustrated in Figures 4 and 7, and designated generally 31, differs only from the implement 8 in that the claw hook 24 is omitted and a clamp, designated generally 32 is attached to the chain 23 and in lieu of the hook 24. The clamp 32, as best seen in Figure 7, includes an elongated bar 33, one end of which is bent outwardly and provided with a substantially V-shaped notch 34. The bar 33 is provided with a struck out portion 35, adjacent its opposite end and which is likewise provided with a substantially V-shaped notch 36 which is disposed in substantially longitudinal alignment with the notch 34. Said last mentioned end of the bar 33 is provided with an eye 37 for attachment to the chain 23. A clamp plate 38 is adjustably and detachably fastened to the inner side of the bar 33, between the notches 34 and 36 by a bolt and wing nut 39, the bolt of which extends through the bar 33 and clamp plate 38. The clamp 32 is adapted to be utilized with the lever 9 for taking up the slack, stretching or tensioning, and holding a portion of mesh wire fence 40, while it is secured to a fence post, all in the same manner as previously described with respect to the implement 8, except as to the attachment of the clamp 32 to the fence wire 40. This is accomplished by loosening or removing the clamp plate 38 and positioning a longitudinal strand of the fence wire 40 in the notches 34 and 36, after which the strand portion therebetween, is anchored to the clamp 32 by reapplying the plate 38 and tightening the fastening 39 for clamping said portion between the plate 38 and the bar 33.

Various other modifications and changes are likewise contemplated and may obviously be resorted to, without departing from the spirit or scope of the invention as hereinafter defined by the appended claims.

I claim as my invention:

1. A wire pulling, tensioning and holding implement comprising an elongated lever having a claw at one end thereof and a hook adjacent each end thereof, and an elongated flexible member detachably and adjustably connected to said hooks and having a claw hook at one of its ends adapted to detachably engage a barb of a barbed wire strand, said flexible member being initially engaged with the lever hook disposed adjacent said claw, and said lever being initially fulcrumed on a fence post or the like for exerting a pull on the flexible member for taking up slack in the strand engaged by the claw hook, said flexible member being adapted to be detachably anchored to the fence post and disengaged from said hook of the lever, said claw being thereafter engageable with a barb of the strand for tensioning the strand by a fulcrum movement of the lever relatively to the fence post, and said flexible member being detachably engageable with the other hook of the lever, disposed remote to the claw and on the opposite side of the fence post to the barbed wire strand for holding the strand under tension while anchored to the fence post.

2. In an implement of the character described, an elongated lever having a claw at one end thereof, a hook adjacent said end and a second hook intermediate of its ends, an elongated flexible member detachably and adjustably engageable initially with the first mentioned hook, means at one end of said flexible member for detachably engaging fence wire, said lever being fulcrumed on a fence post for exerting a pull on the flexible member for initially taking up the slack in the fence wire, said flexible member being disengageable from said first mentioned hook and detachably anchored to the fence post, the claw of said lever being engageable with the fence wire for thereafter tensioning the latter, and said flexible member being then disengageable from the post and detachably engaged with the second hook and on the opposite side of the post to the fence wire, for holding the wire tensioned.

THEODORE L. RUFFIN.

REFERENCES CITED

The following references are of record in the file of this patent:

UNITED STATES PATENTS

| Number | Name | Date |
| --- | --- | --- |
| 485,611 | Copper et al. | Nov. 8, 1892 |
| 723,244 | Cox et al. | Mar. 24, 1903 |
| 770,565 | Doan | Sept. 20, 1904 |
| 807,697 | Townsend | Dec. 19, 1905 |
| 816,298 | Church | Mar. 22, 1906 |
| 917,879 | Linn | Apr. 13, 1909 |
| 1,507,186 | Judge | Sept. 2, 1924 |